United States Patent
Gao

(10) Patent No.: US 12,010,379 B2
(45) Date of Patent: *Jun. 11, 2024

(54) TRANSMITTING METHOD, RECEIVING METHOD, TRANSMITTING DEVICE, AND RECEIVING DEVICE FOR HIGH-DEFINITION VIDEO DATA

(71) Applicant: SHENZHEN LENKENG TECHNOLOGY CO., LTD, Guangdong (CN)

(72) Inventor: Binghai Gao, Guangdong (CN)

(73) Assignee: SHENZHEN LENKENG TECHNOLOGY CO., LTD, Guangdong (CN)

( * ) Notice: Subject to any disclaimer, the term of this patent is extended or adjusted under 35 U.S.C. 154(b) by 202 days.

This patent is subject to a terminal disclaimer.

(21) Appl. No.: 17/442,629

(22) PCT Filed: Mar. 4, 2021

(86) PCT No.: PCT/CN2021/079016
§ 371 (c)(1),
(2) Date: Sep. 24, 2021

(87) PCT Pub. No.: WO2022/121126
PCT Pub. Date: Jun. 16, 2022

(65) Prior Publication Data
US 2023/0102364 A1    Mar. 30, 2023

(30) Foreign Application Priority Data

Dec. 9, 2020    (CN) .......................... 202011432933.X

(51) Int. Cl.
*H04N 21/4402*    (2011.01)

(52) U.S. Cl.
CPC .......................... *H04N 21/440218* (2013.01)

(58) Field of Classification Search
CPC ... H04N 21/234309; H04N 21/440218; H04N 21/6106; H04N 21/6156; H04N 21/643; H04N 21/6437
See application file for complete search history.

(56) References Cited

U.S. PATENT DOCUMENTS 8,095,954 B2 *   1/2012  Walker ............... H04N 21/482
                                                    725/47
9,900,653 B2 *   2/2018  Kitano ............. H04N 21/44227
(Continued)

*Primary Examiner* — Michael B. Pierorazio

(57) ABSTRACT

Disclosed are a transmitting method, a receiving method, a transmitting device and a receiving device for high-definition video data. The transmitting method comprises the follows. High-definition video data with different color space formats is obtained by a transmitting device via an input interface. processing, by the transmitting device, the high-definition video data into a data packet; transmitting, by the transmitting device, the data packet to a first communication module with the transmission rate not less than a first threshold. The first communication module is configured to transmit the data packet. By the adoption of the disclosure, the transmitting device can transmit the high-definition video data to a receiving device through the first communication module and based on a network cable or an optical fiber, so that lossless high-definition video transmission with ultra-low latency can be realized.

10 Claims, 4 Drawing Sheets

Obtaining, by a transmitting device, high-definition video data with different color space formats — 101

Processing, by the transmitting device, the high-definition video data into a data packet — 102

Transmitting, by the transmitting device, the data packet to a first communication module — 103

(56) References Cited

U.S. PATENT DOCUMENTS

| | | | | |
|---|---|---|---|---|
| 10,523,890 B2* | 12/2019 | Gao | | H04N 21/41407 |
| 11,223,870 B2* | 1/2022 | Gao | | H04N 19/593 |
| 11,381,869 B2* | 7/2022 | Gao | | H04N 21/234309 |
| 2002/0144267 A1* | 10/2002 | Gutta | | H04N 21/4532 |
| | | | | 348/E5.104 |
| 2003/0009757 A1* | 1/2003 | Kikinis | | H04N 21/25866 |
| | | | | 725/39 |
| 2003/0051246 A1* | 3/2003 | Wilder | | H04N 7/17318 |
| | | | | 348/E7.071 |
| 2004/0060059 A1* | 3/2004 | Cohen | | G08C 17/02 |
| | | | | 725/29 |
| 2005/0108751 A1* | 5/2005 | Dacosta | | H04N 21/4135 |
| | | | | 348/E5.103 |
| 2006/0123455 A1* | 6/2006 | Pai | | H04N 21/2668 |
| | | | | 348/E7.071 |
| 2007/0061840 A1* | 3/2007 | Walter | | H04N 21/6582 |
| | | | | 725/50 |
| 2007/0061842 A1* | 3/2007 | Walter | | H04N 21/47 |
| | | | | 725/39 |
| 2007/0136742 A1* | 6/2007 | Sparrell | | H04N 21/84 |
| | | | | 348/E5.007 |
| 2008/0025693 A1* | 1/2008 | Lee | | H04N 5/782 |
| | | | | 386/291 |
| 2008/0028318 A1* | 1/2008 | Shikuma | | H04N 21/4751 |
| | | | | 715/744 |
| 2008/0109849 A1* | 5/2008 | Wang | | H04N 21/485 |
| | | | | 725/46 |
| 2010/0115557 A1* | 5/2010 | Billmaier | | G06F 16/435 |
| | | | | 707/E17.014 |
| 2010/0251304 A1* | 9/2010 | Donoghue | | H04N 21/4755 |
| | | | | 725/46 |
| 2011/0023081 A1* | 1/2011 | Mornhineway | | G08C 23/04 |
| | | | | 398/115 |
| 2011/0173665 A1* | 7/2011 | Shim | | H04H 60/06 |
| | | | | 725/46 |
| 2011/0320482 A1* | 12/2011 | Barbieri | | G06F 16/9535 |
| | | | | 707/769 |
| 2012/0074863 A1* | 3/2012 | Shimomura | | H05B 45/37 |
| | | | | 315/246 |
| 2012/0151529 A1* | 6/2012 | Andersson | | H04N 21/4788 |
| | | | | 725/44 |
| 2012/0159551 A1* | 6/2012 | Walter | | H04N 21/482 |
| | | | | 725/45 |
| 2013/0326560 A1* | 12/2013 | Wang | | H04N 21/4782 |
| | | | | 725/56 |
| 2015/0020088 A1* | 1/2015 | Velasco | | H04L 12/2838 |
| | | | | 725/116 |
| 2016/0127771 A1* | 5/2016 | Pasqualino | | H04N 19/65 |
| | | | | 348/474 |
| 2019/0132148 A1* | 5/2019 | Kambhatla | | H04N 21/434 |
| 2021/0099773 A1* | 4/2021 | Bouazizi | | H04N 21/2368 |
| 2022/0109908 A1* | 4/2022 | Chan | | H04N 21/43635 |

* cited by examiner

TRANSMITTING METHOD, RECEIVING METHOD, TRANSMITTING DEVICE, AND RECEIVING DEVICE FOR HIGH-DEFINITION VIDEO DATA

CROSS REFERENCE TO RELATED APPLICATION

The present application is a continuation of International Application No. PCT/CN2021/100921 filed on Jun. 18, 2021, which is based upon and claims priority to Chinese Patent Application Serial No. 202011432933.X on 9 Dec. 2020, the disclosure of which is herein by incorporated by reference.

TECHNICAL FIELD

The disclosure relates to the technical field of communications, and particularly to a transmitting method, a receiving method, a transmitting device, and a receiving device for high-definition video data.

BACKGROUND

With the rapid development of science and technology, people have higher and higher requirements for the clarity, image quality or fluency during video playing, and have requirements on farther and farther video transmission distance. However, a high-definition video has a relatively large data volume. Therefore, a higher transmission bandwidth is required. At the present, there are very few products in the market that can meet the above requirements, and their results are not satisfactory.

SUMMARY

Based on the above problems and the shortcomings of the prior art, the disclosure provides a transmitting method, a receiving method, a transmitting device, and a receiving device for high-definition video data. The transmitting device can transmit the high-definition video data to the receiving device through a first communication module and based on a network cable or an optical fiber. Lossless high-definition video transmission with ultra-low latency can be realized.

In a first aspect, a transmitting method for high-definition video data is provided, where the transmitting method includes the following.

The high-definition video data with different color space formats is obtained, by the transmitting device, via an input interface.

The high-definition video data is processed, by the transmitting device, into a data packet.

The data packet is transmitted, by the transmitting device, to a first communication module. The transmission rate of the first communication module is not less than a first threshold, and the first communication module is configured to transmit the data packet.

In a second aspect, a receiving method for high-definition video data is provided, where the receiving method includes the following.

The data packet is obtained, by a receiving device, by a second communication module. the transmission rate of the second communication module is not less than a second threshold.

The data packet is processed, by the receiving device, to obtain high-definition video data.

In a third aspect, a transmitting device is provided. The transmitting device includes a memory and a processor coupled to the memory. The memory is configured to store an application program code, and the processor is configured to call the application program code to obtain high-definition video data with different color space formats, process the high-definition video data into a data packet, and transmit the data packet to a first communication module, wherein the transmission rate of the first communication module is not less than a first threshold, and the first communication module is configured to transmit the data packet.

In a fourth aspect, a receiving device is provided. The receiving device includes a memory and a processor coupled to the memory. The memory is configured to store an application program code. The processor is configured to call the application program code to obtain a data packet through a second communication module, the transmission rate of the second communication module being not less than a second threshold; and process the data packet to obtain high-definition video data.

The disclosure provides a transmitting method, a receiving method, a transmitting device, and a receiving device for high-definition video data. The transmitting method includes the following. The high-definition video data with different color space formats is obtained by the transmitting device via an input interface. The high-definition video data is processed by the transmitting device into a data packet. The data packet is transmitted by the transmitting device to a first communication module, and the first communication module is configured to transmit the data packet to the receiving device. By the adoption of the disclosure, the high-definition video data can be transmitted by the transmitting device to the receiving device by the first communication module and based on a network cable or an optical fiber, so that lossless high-definition video transmission with ultra-low latency can be realized.

BRIEF DESCRIPTION OF THE DRAWINGS

In order to explain the technical solutions in the implementations of the disclosure more clearly, the drawings used in the description of the implementations are briefly introduced below. Obviously, the drawings in the following description are some implementations of the disclosure. For ordinary technicians, other drawings can be obtained based on these drawings without paying creative efforts.

DETAILED DESCRIPTION

The technical solutions in the disclosure will be described clearly and completely in combination with the accompanying drawings in the disclosure. Obviously, the embodiments described are part of the implementations of the disclosure, but not all of the implementations.

Figure 1:
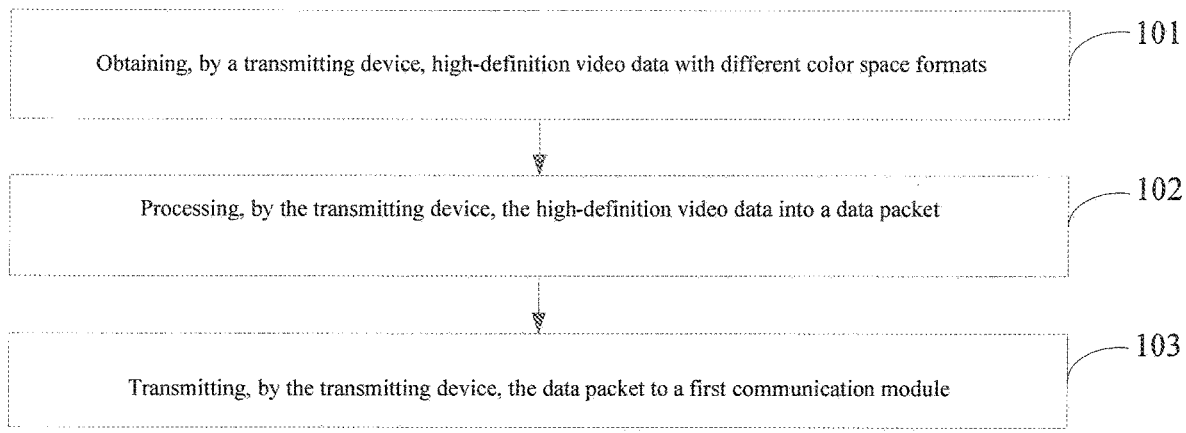
FIG. 1 is a schematic flowchart of a transmitting method for high-definition video data according to the disclosure.

FIG. 1 is a schematic flowchart of a transmitting method for high-definition video data according to the disclosure. As shown in FIG. 1, the transmitting method may include, but not limited to, the following.

At block 101, high-definition video data with different color space formats through an input interface is obtained by a transmitting device.

According to an embodiment of the disclosure, the transmitting device obtains high-definition video data with different color space formats via an input interface may include, but not limited to, the following.

Method 1: the high-definition video data with different color space formats is obtained by the transmitting device based on a high definition multimedia interface (HDMI) protocol. Specifically, the high-definition video data with different color space formats may be obtained by the transmitting device from a video source device (such as a DVD, a set top box, and a camera) through the HDMI protocol. It should be noted that the high-definition video data of the embodiment of the disclosure is source data or raw data.

The high-definition video data may include, but not limited to, multimedia data such as characters, data, sounds, graphs, images or videos (such as 1080P, 4K or 8K high-definition videos with a frame rate of 30 FPS, 60 FPS, 100 FPS or 120 FPS). The high-definition video data may further include, but not limited to, the following characteristic: high dynamic range imaging (HDR). Different color space formats may be YUV of 4:2:2, YUV of 4:2:0, YUV of 4:4:4, or RGB of 8 bit depth.

Method 2: the high-definition video data with different color space formats is obtained by the transmitting device through a Type-C protocol.

Method 3: the high-definition video data with different color space formats is obtained by the transmitting device through a universal serial bus (USB) protocol.

Method 4: the high-definition video data with different color space formats is obtained by the transmitting device through a video graphics array (VGA) protocol.

Method 5: the high-definition video data with different color space formats is obtained by the transmitting device through a display port (DP) protocol.

Method 6: the high-definition video data with different color space formats is obtained by the transmitting device through a mobile industry processor interface (MIPI) protocol.

Method 7: the high-definition video data with different color space formats is obtained by the transmitting device through a low-voltage differential signaling (LVDS) protocol.

Method 8: the high-definition video data with different color space formats is obtained by the transmitting device through a transistor transistor logic (TTL) protocol.

Method 9: the high-definition video data with different color space formats is obtained by the transmitting device through a digital visual interface (DVI) protocol.

At block 102, the high-definition video data is processed by the transmitting device into a data packet.

According to an embodiment of the disclosure, the high-definition video data may be processed by the transmitting device into a data packet in the following ways.

Way 1: the transmitting device further includes a conversion chip. The conversion chip and a first integrated circuit are independently integrated in the transmitting device respectively. Specifically, the transmitting device transmits the high-definition video data to the conversion chip in a field programmable gate array (FPGA) chip based on a first interface protocol, and encapsulates, by the FPGA chip based on a user datagram protocol (UDP), the high-definition video data transmitted by the conversion chip based on a second interface protocol to obtain a UDP data packet.

The first interface protocol includes the HDMI protocol, the DVI protocol, the Type-C protocol, the DP protocol, the USB protocol, the MIPI protocol, or the VGA protocol. The second interface protocol includes the TTL protocol, the LVDS protocol, the MIPI protocol, or a custom interface protocol. The custom interface protocol may be configured to realize hybrid transmission of audios and videos in the high-definition video data. The TTL protocol and the LVDS protocol may respectively realize separate transmission of the audios and videos in the high-definition video data.

More specifically, the transmitting device transmits the high-definition video data to the conversion chip in the FPGA chip based on the first interface protocol, and adds, by the FPGA chip integrated in the transmitting device, a UDP data packet header and a UDP data packet tail to the high-definition video data that is transmitted by the conversion chip based on the second interface protocol. The UDP data packet header or the UDP data packet tail may separately include a destination address, a source address, a port number, a flag bit, and other control information.

Or, the transmitting device transmits the high-definition video data to the conversion chip in an FPGA chip based on a first interface protocol, and encapsulates, by the FPGA chip based on a transmission control protocol (TCP), the high-definition video data transmitted by the conversion chip based on a second interface protocol to obtain a UDP data packet. More specifically, the transmitting device transmits the high-definition video data to the conversion chip in the FPGA chip based on the first interface protocol, and for the high-definition video data that is transmitted by the conversion chip based on the second interface protocol, adds a TCP data packet header and a TCP data packet tail by the FPGA chip integrated in the transmitting device to the first interface data. The TCP data packet header or the TCP data packet tail may separately include a destination address, a source address, a port number, a flag bit, and other control information.

Or, the transmitting device transmits the high-definition video data to the conversion chip in an FPGA chip based on a first interface protocol, and encapsulates, by the FPGA chip based on a second custom communication protocol, the high-definition video data transmitted by the conversion chip based on a second interface protocol to obtain a custom data packet. More specifically, the transmitting device transmits the high-definition video data to the conversion chip in the FPGA chip based on the first interface protocol, and for the high-definition video data that is transmitted by the conversion chip based on the second interface protocol, adds a custom data packet header and a custom data packet tail by the FPGA chip integrated in the transmitting device to the first interface data. The custom data packet header or the custom data packet tail may include a destination address, a source address, a port number, a flag bit, and other control information.

Or, when the first integrated circuit is an application specific integrated circuit (ASIC) chip, the transmitting device transmits the high-definition video data to the conversion chip in the ASIC chip based on a first interface protocol, and encapsulates, by the ASIC chip based on the UDP, the high-definition video data transmitted by the conversion chip based on a second interface protocol to obtain a UDP data packet; or the transmitting device transmits the high-definition video data to the conversion chip in the ASIC chip based on a first interface protocol, and encapsulates, by the ASIC chip based on the TCP, the high-definition video data transmitted via the conversion chip based on a second interface protocol to obtain a TCP data packet; or the transmitting device transmits the high-definition video data to the conversion chip in the FPGA chip based on a first interface protocol, and encapsulates, by the FPGA chip based on the second custom communication protocol, the high-definition video data transmitted by the conversion chip based on a second interface protocol to obtain a custom data packet.

The communication protocol may include, but not limited to, the UDP, the TCP, or the custom communication protocol.

Way 2: the conversion chip is integrated inside the first integrated circuit. Specifically, when the first integrated circuit is a FPGA chip, the transmitting device transmits the high-definition video data to the conversion chip in the FPGA chip based on the first interface protocol, and encapsulates, by the FPGA chip based on the UDP, the high-definition video data transmitted via the conversion chip based on the second interface protocol to obtain a UDP data packet; or, the transmitting device transmits the high-definition video data to the conversion chip in the FPGA chip based on the first interface protocol, and encapsulates, by the FPGA chip based on the TCP, the high-definition video data transmitted by the conversion chip based on the second interface protocol to obtain a TCP data packet; or, the transmitting device transmits the high-definition video data to the conversion chip in the FPGA chip based on the first interface protocol, and encapsulates, by the FPGA chip based on the custom communication protocol, the high-definition video data transmitted by the conversion chip based on a second interface protocol to obtain a custom data packet.

Or, when the first integrated circuit is an ASIC chip, the transmitting device transmits the high-definition video data to the conversion chip in the ASIC chip based on the first interface protocol, and encapsulates, by the ASIC chip based on the UDP, the high-definition video data transmitted via the conversion chip based on the second interface protocol to obtain a UDP data packet; or the transmitting device transmits the high-definition video data to the conversion chip in the ASIC chip through a first interface protocol, and encapsulates, by the ASIC chip based on the TCP communication protocol, the high-definition video data transmitted by the conversion chip based on the second interface protocol to obtain a TCP data packet; or the transmitting device transmits the high-definition video data to the conversion chip in the ASIC chip based on the first interface protocol, and encapsulates, by the ASIC chip based on the custom communication protocol, the high-definition video data transmitted by the conversion chip based on the second interface protocol to obtain a custom data packet.

Way 3: the transmitting device encapsulates the high-definition video data into a UDP data packet by the FPGA chip integrated in the transmitting device based on the UDP. More specifically, the transmitting device adds a UDP data packet header and a UDP data packet tail to the high-definition video data via the FPGA chip integrated in the transmitting device. The UDP data packet header or the UDP data packet tail may include a destination address, a source address, a port number, a flag bit, and other control information.

Way 4: the transmitting device encapsulates the high-definition video data into a TCP data packet by the FPGA chip based on the TCP.

The transmitting device adds a TCP data packet header and a TCP data packet tail to the high-definition video data by the FPGA chip integrated in the transmitting device. The TCP data packet header or the TCP data packet tail may include a destination address, a source address, a port number, a flag bit, and other control information.

Way 5: the transmitting device encapsulates the high-definition video data into a custom data packet by the FPGA chip based on the custom communication protocol. More specifically, the transmitting device adds a custom data packet header and a custom data packet tail to the high-definition video data via the FPGA chip integrated in the transmitting device. The custom data packet header or the custom data packet tail may include a destination address, a source address, a port number, a flag bit, and other control information.

Way 6: the transmitting device encapsulates the high-definition video data into a UDP data packet by the ASIC chip integrated in the transmitting device based on the UDP.

Way 7: the transmitting device encapsulates the high-definition video data into a TCP data packet by the ASIC chip based on the TCP.

Way 8: the transmitting device encapsulates the high-definition video data into a custom data packet by the ASIC chip based on the custom communication protocol.

Way 9: the transmitting device includes a first integrated circuit;

when the first integrated circuit is a FPGA chip, the transmitting device compresses the high-definition video data by the FPGA chip based on a distortionless coding algorithm to obtain first data, and encapsulates the first data through the communication protocol to obtain a data packet;

when the first integrated circuit is an ASIC chip, the transmitting device compresses the high-definition video data by the ASIC chip based on a distortionless coding algorithm to obtain first data, and encapsulates the first data through the communication protocol to obtain a data packet.

The communication protocol includes the UDP, the TCP, or a second custom communication protocol.

The distortionless coding algorithm may include, but not limited to:

a run-length coding algorithm, a Huffman coding algorithm, a constant block coding algorithm for binary images, a quadtree coding algorithm, a wavelet transform coding algorithm or a custom arithmetic coding algorithm.

The custom arithmetic coding algorithm is taken as an example. The first integrated circuit can compress redundant data in the high-definition video data based on the custom arithmetic coding algorithm to obtain the first data, and encapsulates the first data through the communication protocol to obtain a data packet.

For example, when the high-definition video data is 0 that occupies 6 bytes, that is, 000000000000, the first integrated circuit can obtain the first data (0600) that only needs to occupy 2 bytes after compressing redundant data in the high-definition video data based on the custom arithmetic coding algorithm, so that compression of the redundant data in the high-definition video data is realized.

At block 103, the transmitting device transmits the data packet to a first communication module.

According to an embodiment of the disclosure, the transmission rate of the first communication module is not less than a first threshold, and the first threshold may include, but not limited to 1 Gbps, 2.5 Gbps, 5 Gbps, 10 Gbps, or 25 Gbps.

It should be noted that the transmitting device transmits the data packet to the first communication module in, but not limited to, the following methods.

Method 1:

The first communication module includes an electrical module. The electrical module includes a physical layer (PHY) chip and a RJ-45 interface.

The transmitting device transmits the data packet to the PHY chip (an Ethernet PHY data transceiver) via a MAC unit based on a third interface protocol. The PHY chip is configured to output the data packet to the RJ-45 interface, and the RJ-45 interface is configured to transmit the data packet. The third interface protocol includes a XFI protocol, a media independent interface (MII) protocol, a gigabit media independent interface (GMII) protocol, a reduced gigabit media independent interface (RGMII) protocol, a serial gigabit media independent interface (SGMII) protocol, a Serdes protocol, a XAUI protocol or a RXAUI protocol. The data packet includes a UDP data packet, a TCP data packet, or a custom data packet.

Method 2:

The first communication module includes an optical module.

The transmitting device transmits the data packet to the optical module via the MAC unit based on the third interface protocol. The optical module is configured to convert the data packet into an optical signal and transmit the optical signal based on an optical fiber. The optical module may include, but not limited to, a single-fiber bidirectional optical module (specifically including a single-mode optical module for long-distance transmission and a multi-mode optical module for short-distance transmission).

It should be noted that when the first communication module is an electrical module, after the transmitting device transmits the data packet to the first communication module, the transmitting device may further execute the following.

The transmitting device modulates the data packet by the PHY chip, then outputs the data packet to the RJ-45 interface, and transmits the data packet to a receiving device via the RJ-45 interface; or, the transmitting device modulates the data packet by the PHY chip, then outputs the data packet to the RJ-45 interface, and transmits the data packet to a switch via the RJ-45 interface, and the switch is configured to forward the data packet to the receiving device.

The data packet includes a UDP data packet, a TCP data packet, or a custom data packet.

Figure 2:
FIG. 2-FIG. 4 are schematic diagrams of a transmission scenario for high-definition video data according to the disclosure.

FIG. 2 is a schematic diagram of a transmission scenario for high-definition video data. As shown in FIG. 2, in this scenario, the transmitting device transmits the data packet to the receiving device through the first communication module based on a network cable or an optical fiber.

Figure 3:
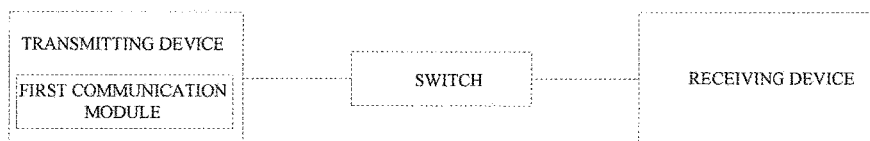

FIG. 3 is a schematic diagram of a transmission scenario for high-definition video data. As shown in FIG. 3, in this scenario, the transmitting device transmits the data packet to the switch by the first communication module based on the network cable or the optical fiber, and the switch forwards the data packet to the receiving device.

It should be noted that when the first communication module is an optical module, after the transmitting device transmits the data packet to the first communication module, the transmitting device may further execute the following.

The transmitting device converts the data packet into an optical signal by the optical module and transmits the optical signal to the receiving device; or, the transmitting device converts the data packet into an optical signal by the optical module and transmits the optical signal to the switch, and the switch is configured to forward the optical signal to the receiving device.

The data packet includes a UDP data packet, a TCP data packet, or a custom data packet.

It should be noted that when the receiving device includes a first receiving device and a second receiving device, and the data packet includes a UDP data packet or a TCP data packet, after the transmitting device transmits the data packet to the first communication module, the transmitting device may further execute the following.

The transmitting device modulates the UDP data packet by the PHY chip, then outputs the data packet to the RJ-45 interface, and transmits the data packet to a switch via the RJ-45 interface, and the switch is configured to forward the UDP data packet to the first receiving device and the second receiving device respectively; or, The transmitting device modulates the TCP data packet by the PHY chip, then outputs the data packet to the RJ-45 interface, and transmits the data packet to a switch via the RJ-45 interface, and the switch is configured to forward the TCP data packet to the first receiving device and the second receiving device respectively.

It should be noted that when the receiving device includes a first receiving device and a second receiving device, and the data packet includes a UDP data packet or a TCP data packet, after the transmitting device transmits the data packet to the first communication module, the transmitting device may further execute the following.

The transmitting device converts the UDP data packet or the TCP data packet into an optical signal by the optical module and transmits the optical signal to the switch, and the switch is configured to forward the optical signal to the first receiving device and the second receiving device.

Figure 4:
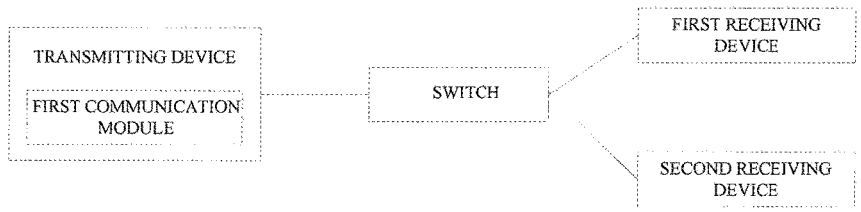

FIG. 4 is a schematic diagram of a transmission scenario for high-definition video data. As shown in FIG. 4, in this scenario, the receiving device includes a first receiving device and a second receiving device;

the transmitting device transmits the UDP data packet to the switch by the first communication module based on the network cable or the optical fiber, and the switch forwards the UDP data packet to the receiving device; or, the transmitting device transmits the TCP data packet to the switch by the first communication module based on the network cable or the optical fiber, and the switch forwards the TCP data packet to the receiving device.

Figure 5:
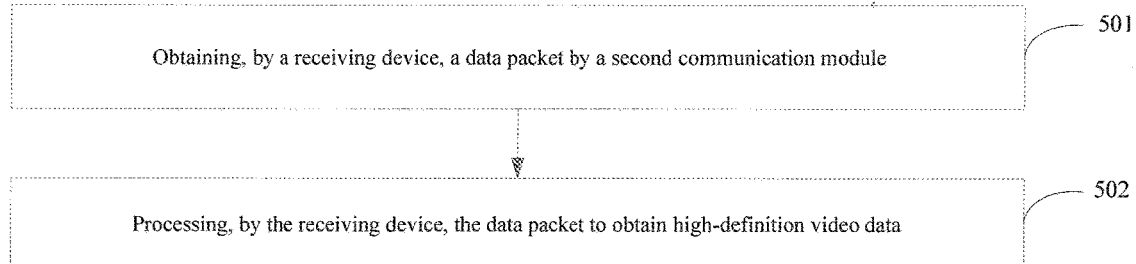
FIG. 5 is a schematic flowchart of a receiving method for high-definition video data according to the disclosure.

FIG. 5 is a schematic flowchart of a receiving method for high-definition video data according to the disclosure. As shown in FIG. 5, the receiving method may include, but not limited to, the following.

At block 501, a data packet is obtained by a receiving device by a second communication module.

According to an embodiment of the disclosure, the transmission rate of the second communication module is not less than a second threshold, and the second threshold may include, but not limited to, 1 Gbps, 2.5 Gbps, 5 Gbps, 10 Gbps, or 25 Gbps.

It should be noted that the data packet is obtained by the receiving device by the second communication module in, but not limited to, the following methods.

Method 1: when the second communication module includes an electrical module, the electrical module includes a PHY chip and a RJ-45 interface.

The receiving module obtains, via the RJ-45 interface integrated in the receiving device, a data packet transmitted by the transmitting device or forwarded by the switch, and transmits the data packet to the PHY chip (an Ethernet PHY data transceiver). Specifically, Method 2:
when the second communication module includes an optical module;

the receiving device converts, by the optical module integrated in the receiving device, the optical signal transmitted by the transmitting device or forwarded by the switch into a data packet. The optical module may include, but not limited to, a single-fiber bidirectional optical module (specifically including a single-mode optical module for long-distance transmission and a multi-mode optical module for short-distance transmission).

It should be noted that the receiving device may output the data packet to a second integrated circuit by the second communication module.

At block 502, the data packet is processed by the receiving device to obtain high-definition video data.

According to an embodiment of the disclosure, the data packet is processed by the receiving device to obtain high-definition video data, which may include, but not limited to, the following methods.

Method 1:
the receiving device further includes a conversion chip. The conversion chip and the second integrated circuit are independently integrated in the receiving device respectively. Specifically, when the second integrated circuit is a FPGA chip, the receiving device decapsulates the UDP data packet via the FPGA chip based on the UDP to obtain high-definition video data and outputs the high-definition video data to the conversion chip through a fourth interface protocol. The fourth interface protocol includes a TTL protocol, an LVDS protocol, a MIPI protocol, or a custom interface protocol. Specifically, the transmitting device removes the UDP data packet header and the UDP data packet tail from the UDP data packet based on the UDP by the FPGA chip integrated in the transmitting device to obtain the high-definition video data, and outputs the high-definition video data to the conversion chip through the fourth interface protocol.

Or, the receiving device decapsulates the TCP data packet by the FPGA chip based on the TCP to obtain high-definition video data and outputs the high-definition video data to the conversion chip through a fourth interface protocol. Specifically, the transmitting device removes the TCP data packet header and the TCP data packet tail from the TCP data packet based on the TCP by the FPGA chip integrated in the transmitting device to obtain the high-definition video data, and outputs the high-definition video data to the conversion chip through the fourth interface protocol.

Or, the receiving device decapsulates the custom data packet by the FPGA chip based on the custom communication protocol to obtain high-definition video data and outputs the high-definition video data to the conversion chip through the fourth interface protocol. Specifically, the transmitting device removes the custom data packet header and the custom data packet tail from the custom data packet based on the custom protocol by the FPGA chip integrated in the transmitting device to obtain the high-definition video data, and outputs the high-definition video data to the conversion chip through the fourth interface protocol.

Or, when the second integrated circuit is a ASIC chip, the receiving device decapsulates the UDP data packet by the ASIC chip based on the UDP to obtain high-definition video data and outputs the high-definition video data to the conversion chip through the fourth interface protocol; or, the receiving device decapsulates the TCP data packet via the ASIC chip based on the TCP communication protocol to obtain high-definition video data and outputs the high-definition video data to the conversion chip through the fourth interface protocol; or, the receiving device decapsulates the custom data packet by the ASIC chip based on the custom communication protocol to obtain high-definition video data and outputs the high-definition video data to the conversion chip through the fourth interface protocol.

Method 2:
the receiving device further includes a conversion chip, and the conversion chip is integrated in a second integrated circuit.

When the second integrated circuit is a FPGA chip, the receiving device decapsulates the UDP data packet by the FPGA chip based on the UDP to obtain high-definition video data and outputs the high-definition video data to the conversion chip through the fourth interface protocol; or, the receiving device decapsulates the TCP data packet by the FPGA chip based on the TCP to obtain high-definition video data and outputs the high-definition video data to the conversion chip through the fourth interface protocol; or, the receiving device decapsulates the custom data packet via the FPGA chip based on the custom communication protocol to obtain high-definition video data and outputs the high-definition video data to the conversion chip through the fourth interface protocol; or, when the second integrated circuit is an ASIC chip, the receiving device decapsulates the UDP data packet via the ASIC chip based on the UDP to obtain high-definition video data and outputs the high-definition video data to the conversion chip through the fourth interface protocol; or, the receiving device decapsulates the TCP data packet by the ASIC chip based on the TCP communication protocol to obtain high-definition video data and outputs the high-definition video data to the conversion chip through the fourth interface protocol; or, the receiving device decapsulates the custom data packet by the ASIC chip based on the custom communication protocol to obtain high-definition video data and outputs the high-definition video data to the conversion chip through the fourth interface protocol.

Method 3: when the receiving device includes a second integrated circuit, and the second integrated circuit is a FPGA chip, the receiving device processes the UDP data packet based on the UDP by the FPGA chip integrated in the receiving device to obtain high-definition video data. More specifically, the transmitting device removes the UDP data packet header and the UDP data packet tail from the UDP data packet based on the UDP by the FPGA chip integrated in the transmitting device to obtain the high-definition video data.

Method 4: when the receiving device includes a second integrated circuit, and the second integrated circuit is a FPGA chip, the receiving device decapsulates the TCP data packet based on the TCP by the FPGA chip to obtain high-definition video data. Specifically, the transmitting device removes the TCP data packet header and the TCP data packet tail from the TCP data packet based on the TCP protocol by the FPGA chip integrated in the transmitting device to obtain the high-definition video data.

Method 5: when the receiving device includes a second integrated circuit, and the second integrated circuit is a FPGA chip, the receiving device decapsulates a custom data packet based on the custom communication protocol by the FPGA chip to obtain high-definition video data. Specifically, the transmitting device removes the custom data packet header and the custom data packet tail from the custom data packet based on the custom communication protocol by the FPGA chip integrated in the transmitting device to obtain the high-definition video data.

Method 6: when the receiving device includes a second integrated circuit, and the second integrated circuit is an ASIC chip, the receiving device decapsulates the UDP data packet based on the UDP communication protocol by the ASIC chip integrated in the receiving device to obtain high-definition video data.

Method 7: when the receiving device includes a second integrated circuit, and the second integrated circuit is an ASIC chip, the receiving device decapsulates the TCP data packet based on the TCP communication protocol by the ASIC chip to obtain high-definition video data.

Method 8: when the receiving device includes a second integrated circuit, and the second integrated circuit is an ASIC chip, the receiving device decapsulates the custom data packet based on the custom communication protocol by the ASIC chip to obtain high-definition video data.

Method 9: the receiving device includes a second integrated circuit. When the second integrated circuit is a FPGA chip, the receiving device decapsulates the data packet based on the communication protocol by the FPGA chip to obtain first data and decompresses the first data based on the distortionless decoding algorithm to obtain high-definition video data.

The communication protocol includes the UDP communication protocol, the TCP, or the custom communication protocol.

The distortionless decoding algorithm includes a run-length decoding algorithm, a Huffman decoding algorithm, a constant block decoding algorithm for binary images, a quadtree decoding algorithm, a wavelet transform decoding algorithm or a custom arithmetic decoding algorithm.

It should be noted that the receiving device may perform interpolation on the first data based on the custom arithmetic decoding algorithm and recover the high-definition video data.

It should be noted that the receiving device processes the data packet via the second integrated circuit, and may further execute the following after obtaining the high-definition video data.

The receiving device outputs the high-definition video data to a display device through a fifth interface protocol. The fifth interface protocol includes the HDMI protocol, the DVI protocol, the Type-C protocol, the DP protocol, the USB protocol, the MIPI protocol, or the VGA protocol.

Figure 6:
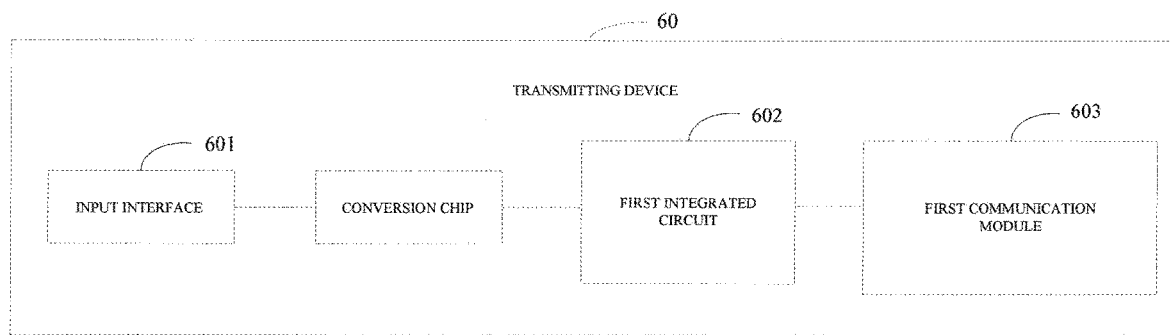
FIG. 6-FIG. 9 are schematic diagrams of a transmitting device for high-definition video data according to the disclosure.

The disclosure provides a transmitting device, as shown in FIG. 6, which can be configured to realize the transmitting method for high-definition video data of the embodiment of FIG. 1. Specifically, the transmitting device 60 may include, but not limited to, an input interface 601, a first integrated circuit 602 and a first communication module 603, and may further include a conversion chip. It should be noted that the conversion chip and the first integrated circuit 602 are independently integrated in the transmitting device respectively.

The input interface 601 is configured to receive high-definition video data with different color space formats; and the conversion chip is configured to output the high-definition video data to the first integrated circuit via a first communication temporal interface of the conversion chip after receiving the high-definition video data via an interface coupled to the input interface 601.

The first communication temporal interface includes a LVDS interface, a TTL interface, a MIPI, or a custom interface.

It should be noted that the LVDS interface or the TTL interface may respectively be interfaces configured to separately transmit audios and videos in the high-definition video data. The custom interface is an interface configured to realize hybrid transmission of the audios and videos in the high-definition video data.

The first integrated circuit 602 may be configured to process the high-definition video data into a data packet based on a communication protocol;

the first communication module 603 is configured to transmit the data packet.

It should be noted that the high-definition video data with different color space formats in the embodiments of the disclosure is source data or raw data.

It should be noted that the high-definition video data with different color space formats may include, but not limited to, multimedia data such as characters, data, sounds, graphs, images or videos (such as 1080P, 4K or 8K high-definition videos with a frame rate of 30 FPS, 60 FPS, 100 FPS or 120 FPS). The high-definition video data may further include, but not limited to, the following characteristic: high dynamic range imaging (HDR). Different color space formats may be YUV of 4:2:2, YUV of 4:2:0, YUV of 4:4:4, or RGB of 8 bit depth.

It should be noted that the input interface 101 may include, but not limited to:
a HDMI interface, a Type-C interface, a DVI, a DP interface, a USB interface, a VGA interface, a LVDS interface, a TTL interface or a MIPI.

The protocol includes a UDP, a TCP, or a custom communication protocol. The first integrated circuit 602 may include, but not limited to, a FPGA chip or an ASIC chip.

The first integrated circuit 602 is specifically configured to:
encapsulate the high-definition video data into a UDP data packet based on the UDP;
encapsulate the high-definition video data into a TCP data packet based on the TCP; or
encapsulate the high-definition video data into a custom data packet based on the custom communication protocol.

It should be noted that the transmission rate of the first communication module 603 is not less than a first threshold.

It should be noted that the first integrated circuit 602 is also specifically configured to:
compress the high-definition video data based on a distortionless coding algorithm to obtain first data, and encapsulate the first data through a communication protocol to obtain a data packet.

The distortionless coding algorithm includes:
a run-length coding algorithm, a Huffman coding algorithm, a constant block coding algorithm for binary images, a quadtree coding algorithm, a wavelet transform coding algorithm, or a custom arithmetic coding algorithm.

The custom arithmetic coding algorithm is taken as an example. The first integrated circuit 602 can compress redundant data in the high-definition video data based on the custom arithmetic coding algorithm to obtain the first data, and encapsulates the first data through a communication protocol to obtain a data packet.

For example, when the high-definition video data is 0 that occupies 6 bytes, that is, 000000000000, the first integrated circuit 602 can obtain the first data (0600) that only needs to occupy 2 bytes after compressing redundant data in the high-definition video data based on the custom arithmetic coding algorithm, so that compression of the redundant data in the high-definition video data is realized. The first communication module 603 may include, but not limited to, an electrical module or an optical module. The electrical module includes a PHY chip and an RJ-45 interface. The transmission rate of the optical module is not less than the first threshold, and the transmission rate of the electrical module is not less than the first threshold. The first threshold may include, but not limited to, 1 Gbps, 2.5 Gbps, 5 Gbps, 10 Gbps, or 25 Gbps.

When the first communication module 603 is an electrical module, the transmission rate of the electrical module is not less than the first threshold. The electrical module is configured to:

after the first integrated circuit 602 configured to output the data packet to a MAC unit in the first integrated circuit 602 and output the data packet to the PHY chip by a second communication temporal interface of the MAC unit, output the data packet to the RJ-45 interface by the PHY chip, and transmit the data packet to a receiving device via the RJ-45 interface; or,
output the data packet to the RJ-45 interface by the PHY chip, and transmit the data packet to a switch via the RJ-45 interface, and the switch is configured to forward the data packet to the receiving device; or,
when the first communication module 603 is an optical module, the transmission rate of the optical module is not less than the first threshold.

The optical module is configured to:
after the first integrated circuit 602 configured to outputs the data packet to the MAC unit in the first integrated circuit 602 and outputs the data packet to the optical module via a second communication temporal interface of the MAC unit,
convert the data packet into an optical signal, and transmit the optical signal to the receiving device; or,
convert the data packet into an optical signal, and transmit the optical signal to the switch, and the switch is configured to forward the optical signal to the receiving device.

The second communication temporal interface includes a XFI, a GMII, a SMII, a RGMII, a XGMII, a Serdes interface, a XAUI or a RXAUI. The data packet includes a UDP data packet, a TCP data packet, or a custom data packet.

The transmitting device 60 may also be configured to:
after the transmitting device 60 transmits the data packet to the first communication module 603, output the data packet to the receiving device by the first communication module; or,
after the transmitting device 60 transmits the data packet to the first communication module 603, output the data packet to the switch by the first communication module, and the switch may be configured to forward the data packet to the receiving device.

It should be understood that the transmitting device 60 is only one example according to the embodiments of the disclosure. The transmitting device 60 may have more or fewer parts than indicated, may combine two or more parts, or may have different configuration implementations of parts.

It can be understood that an embodiment for functional parts included in the transmitting device 60 of FIG. 6 may refer to the embodiment of FIG. 1, and descriptions thereof are omitted here.

Figure 7:
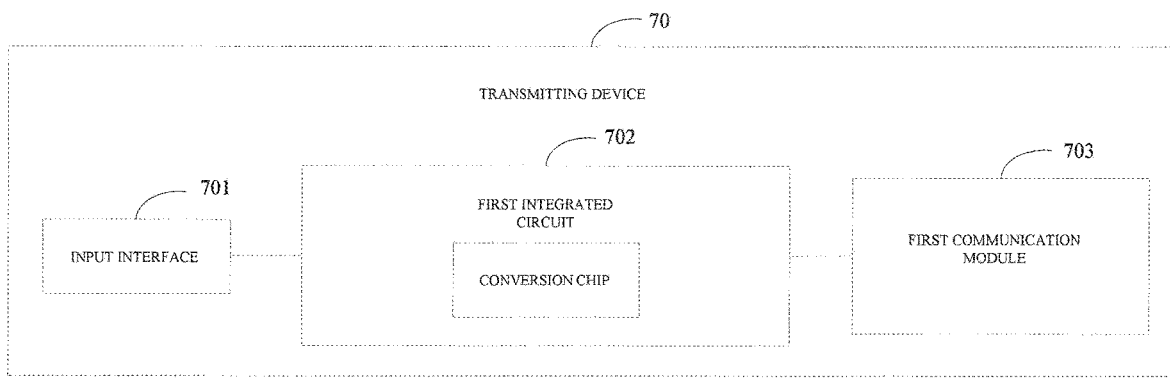

The disclosure provides another transmitting device, as shown in FIG. 7, which can be configured to realize the transmitting method for high-definition video data of the embodiment of FIG. 1. Specifically,
the transmitting device 70 may include, but not limited to, an input interface 701, a first integrated circuit 702, and a first communication module 703, the transmitting device 70 may further include a conversion chip. The conversion chip is integrated in the first integrated circuit 702;
the input interface 701 is configured to receive the high-definition video data;
the first integrated circuit 702 may be configured to process the high-definition video data into a data packet;

the first integrated circuit 702 is specifically configured to:
after the high-definition video data is output to the first integrated circuit via a first communication temporal interface of the conversion chip, encapsulate the high-definition video data into a UDP data packet based on a UDP or, after the high-definition video data is output to the first integrated circuit via a first communication temporal interface of the conversion chip, encapsulate the high-definition video data into a TCP data packet based on a TCP; or, after the high-definition video data is output to the first integrated circuit via a first communication temporal interface of the conversion chip, encapsulate the high-definition video data into a custom data packet based on a custom communication protocol.

It should be noted that the first integrated circuit 702 is also specifically configured to:
after the high-definition video data is output to the first integrated circuit via the first communication temporal interface of the conversion chip, compress the high-definition video data based on a distortionless coding algorithm to obtain first data, and encapsulate the first data through the communication protocol (such as the UDP communication protocol, the TCP communication protocol, or the custom communication protocol) to obtain the data packet.

The distortionless coding algorithm includes:
a run-length coding algorithm, a Huffman coding algorithm, a constant block coding algorithm for binary images, a quadtree coding algorithm, a wavelet transform coding algorithm or a custom arithmetic coding algorithm.

The first communication module 703 is configured to transmit the data packet.

It should be understood that the transmitting device 70 is only one example according to the embodiments of the disclosure. The transmitting device 70 may have more or fewer parts than indicated, may combine two or more parts, or may have different configuration implementations of parts.

It can be understood that embodiments and undefined definitions or illustrations for functional parts included in the transmitting device 70 of FIG. 7 may refer to the embodiment of FIG. 1 and the embodiment of FIG. 6, and descriptions thereof are omitted here.

Figure 8:
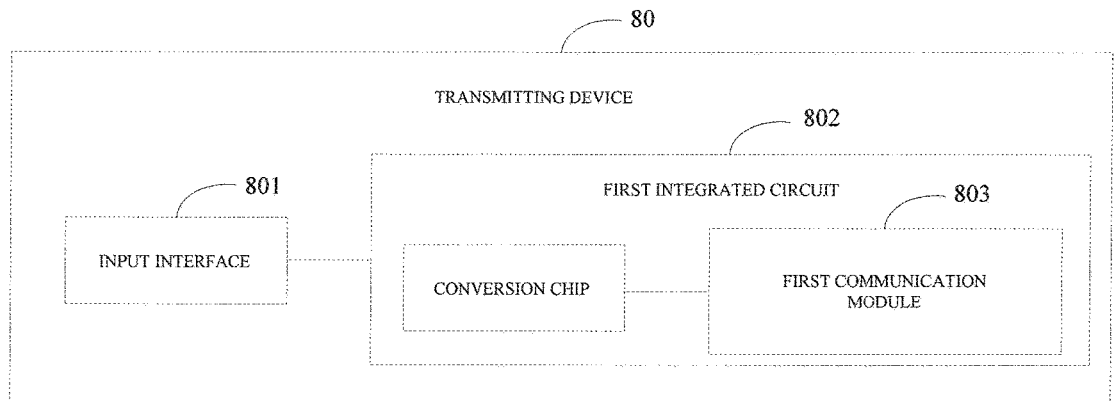

The disclosure provides another transmitting device, as shown in FIG. 8, which can be configured to realize the transmitting method for high-definition video data of the embodiment of FIG. 1. Specifically,
the transmitting device 80 may include, but not limited to, an input interface 801, a first integrated circuit 802, a first communication module 803, and a conversion chip. The conversion chip and the first communication module 803 are integrated in the first integrated circuit 802.

The input interface 801 is configured to obtain the high-definition video data;
the conversion chip is configured to output the high-definition video data to the first integrated circuit 802 via a first communication temporal interface of the conversion chip;
the first integrated circuit 802 is configured to process the high-definition video data output via the first communication temporal interface of the conversion chip in the first integrated circuit 802 to obtain a data packet;
the first communication module 803 is configured to transmit the data packet.

It can be understood that embodiments and undefined definitions or illustrations for functional parts included in the transmitting device 80 of FIG. 8 may refer to the embodiment of FIG. 1 and the embodiment of FIG. 6, and descriptions thereof are omitted here.

Figure 9:
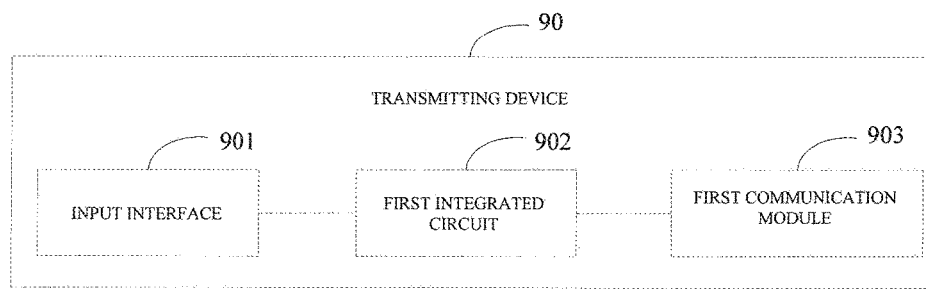

The disclosure provides another transmitting device, as shown in FIG. 9, which can be configured to realize the transmitting method for high-definition video data of the embodiment of FIG. 1. Specifically,
the transmitting device 90 may include, but not limited to, an input interface 901, a first integrated circuit 902 and a first communication module 903. The input interface 901, the first integrated circuit 902 and the first communication module 903 are sequentially connected.

The input interface 901 is configured to obtain high-definition video data with different color space formats;
the first integrated circuit 902 is configured to process the high-definition video data into a data packet;
the first communication module 903 is configured to transmit the data packet.

It should be noted that the high-definition video data may include, but not limited to, sensation multimedia data such as characters, data, sounds, graphs, images or videos (such as 1080P, 4K or 8K high-definition videos with a frame rate of 30 FPS, 60 FPS, 100 FPS or 120 FPS). The high-definition video data may further include, but not limited to, the following characteristic: high dynamic range imaging (HDR). Data formats may be YUV of 4:2:2, YUV of 4:2:0, or RGB of 8 bit depth.

The communication protocol includes a UDP communication protocol, a TCP communication protocol, or a custom communication protocol.

It should be noted that the input interface 901 may include, but not limited to:
a HDMI, a Type-C interface, a DP interface, a USB interface, a VGA interface, a DVI, or a MIPI.

It should be noted that the first integrated circuit 902 may include, but not limited to a FPGA chip or an ASIC chip.

The first integrated circuit 902 is specifically configured to:
encapsulate the high-definition video data into a UDP data packet based on the UDP; or,
encapsulate the high-definition video data into a TCP data packet based on the TCP; or,
encapsulate the high-definition video data into a custom data packet based on the custom communication protocol.

It should be noted that the first integrated circuit 902 is also specifically configured to:
compress the high-definition video data based on a distortionless coding algorithm to obtain first data, and encapsulate the first data through the communication protocol (such as the UDP, the TCP, or the custom communication protocol) to obtain a data packet.

The first communication module 903 may include, but not limited to, an electrical module or an optical module. The electrical module includes a PHY chip and a RJ-45 interface. The transmission rate of the optical module is not less than the first threshold, and the transmission rate of the electrical module is not less than the first threshold. The first threshold may include, but not limited to, 1 Gbps, 2.5 Gbps, 5 Gbps, 10 Gbps, or 25 Gbps.

The transmitting device 90 may also be configured to:
after the transmitting device 90 transmits the data packet to the first communication module 903 with the transmission rate not less than the first threshold, output the data packet to the receiving device through the first communication module; or, after the transmitting device 90 configured to transmit the data packet to the first communication module 903 with the transmission rate not less than the first threshold, output the data packet to the switch by the first communication module, and the switch may be configured to forward the data packet to the receiving device.

It should be understood that the transmitting device 90 is only one example according to the embodiments of the disclosure. The transmitting device 80 may have more or fewer parts than indicated, may combine two or more parts, or may have different configuration implementations of parts.

It can be understood that embodiments and undefined definitions or illustrations for functional parts included in the transmitting device 90 of FIG. 9 may refer to the embodiment of FIG. 1, and descriptions thereof are omitted here.

Figure 10:
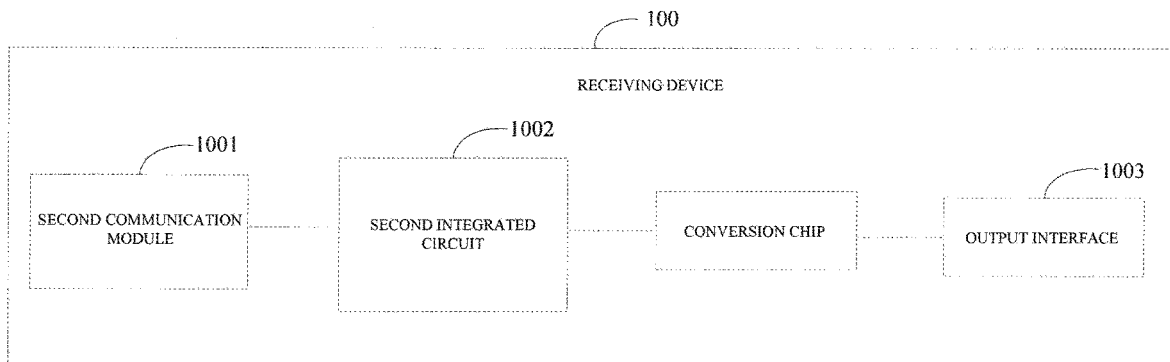
FIG. 10-FIG. 13 are schematic diagrams of a receiving device for high-definition video data according to the disclosure.

The disclosure provides a receiving device, as shown in FIG. 10, which can be configured to realize the receiving method for high-definition video data of the embodiment of FIG. 5. Specifically, the receiving device 100 may include, but not limited to, a second communication module 1001, a second integrated circuit 1002 and an output interface 1003, and may further include a conversion chip. It should be noted that the conversion chip and the second integrated circuit 1002 are independently integrated in a transmitting device respectively.

The second communication module 1001 may be configured to obtain the data packet from the transmitting device, or obtain the data packet from the switch;

the second integrated circuit 1002 may be configured to process the data packet to obtain high-definition video data. The second integrated circuit 1002 may include, but not limited to, a FPGA chip or an ASIC chip.

The conversion chip is configured to output the high-definition video data to the output interface 1003 via a third communication temporal interface of the conversion chip. The third communication temporal interface may include, but not limited to, a HDMI, a DVI, a Type-C interface, a DP interface, a USB interface, a VGA interface, or a MIPI.

When the second communication module 1001 includes an electrical module, the electrical module includes a PHY chip and a RJ-45 interface.

The electrical module may be configured to:

receive the data packet transmitted by the transmitting device via the RJ-45 interface and output the data packet to the second integrated circuit 1002 by the PHY chip and a fourth communication temporal interface of a MAC unit in the second integrated circuit 1002. The fourth communication temporal interface includes a XFI, a GMII, a SMII, a RGMII, a XGMII, a Serdes interface, a XAUI, or a RXAUI; or, receive, via the RJ-45 interface, the data packet forwarded by the switch and output the UDP data packet to the second integrated circuit 1002 by the PHY chip and the fourth communication temporal interface of the MAC unit in the second integrated circuit 1002. Or, when the second communication module 1001 is an optical module, the transmission rate of the optical module is not less than a second threshold.

The optical module may be configured to:

receive an optical signal transmitted by the transmitting device, convert the optical signal into a data packet, and output the data packet to the second integrated circuit 1002 via the fourth communication temporal interface of the MAC unit in the second integrated circuit 1002, or receive an optical signal forwarded by the switch, convert the optical signal into a data packet, and output the data packet to the second integrated circuit 1002 via the fourth communication temporal interface of the MAC unit in the second integrated circuit 1002.

The data packet includes a UDP data packet, a TCP data packet, or a custom data packet. The second integrated circuit 1002 is specifically configured to:

when the data packet is a UDP data packet, decapsulate the UDP data packet into high-definition video data based on the UDP; or, when the data packet is a TCP data packet, decapsulate the TCP data packet into high-definition video data based on the TCP; or, when the data packet is a custom data packet, decapsulate the custom data packet into high-definition video data based on the custom communication protocol.

The second integrated circuit 1002 is also configured to:

decapsulate the data packet based on the communication protocol (such as the UDP, the TCP, or the custom communication protocol) to obtain first data and decompress the first data based on a distortionless decoding algorithm to obtain high-definition video data;

more specifically, when the data packet is a UDP data packet, decapsulate the UDP data packet based on the UDP to obtain first data and decompress the first data based on the distortionless decoding algorithm to obtain high-definition video data;

or, when the data packet is a TCP data packet, decapsulate the TCP data packet based on the TCP to obtain first data and decompress the first data based on a distortionless decoding algorithm to obtain high-definition video data;

or, when the data packet is a custom data packet, decapsulate the custom data packet based on the custom communication protocol to obtain first data and decompress the first data based on a distortionless decoding algorithm to obtain high-definition video data.

The distortionless decoding algorithm includes:

a run-length decoding algorithm, a Huffman decoding algorithm, a constant block decoding algorithm for binary images, a quadtree decoding algorithm, a wavelet transform decoding algorithm or a custom arithmetic decoding algorithm.

The second integrated circuit 1002 may be specifically configured to perform interpolation on the first data based on the custom arithmetic decoding algorithm and recover the high-definition video data.

The output interface 1003 may be configured to output the high-definition video data to an output device (such as a display device) connected to the receiving device 100.

It should be noted that the second communication module 1001 may include, but not limited to, an electrical module or an optical module. The transmission rate of the optical module is not less than the second threshold, and the transmission rate of the electrical module is not less than the second threshold. The second threshold may include, but not limited to, 1 Gbps, 2.5 Gbps, 5 Gbps, 10 Gbps or 25 Gbps.

It should be understood that the receiving device 100 is only one example according to the embodiments of the disclosure. The receiving device 100 may have more or fewer parts than indicated, may combine two or more parts, or may have different configuration implementations of parts.

It can be understood that embodiments and undefined definitions or illustrations for functional parts included in the receiving device 100 of FIG. 10 may refer to the embodiment of FIG. 5, and descriptions thereof are omitted here.

Figure 11:
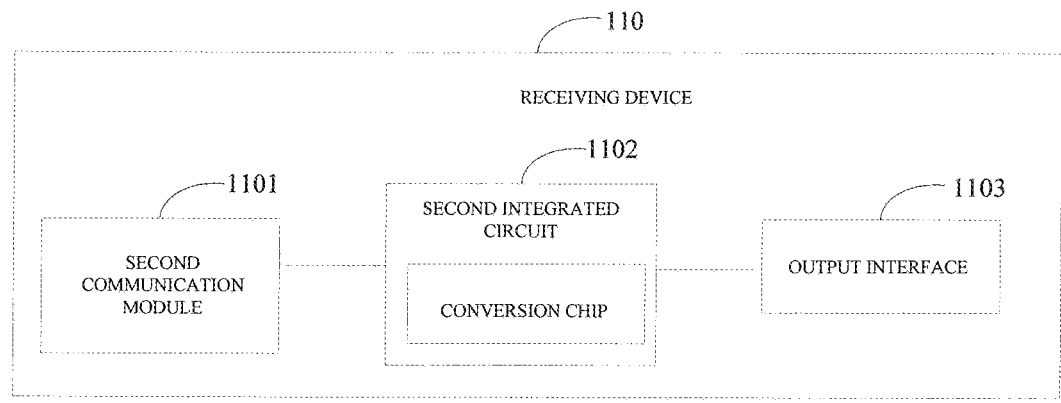

The disclosure provides another receiving device, as shown in FIG. 11, which can be configured to realize the receiving method for high-definition video data of the embodiment of FIG. 5.

The receiving device 110 may include, but not limited to, a second communication module 1101, a second integrated circuit 1102 and an output interface 1103, and may further include a conversion chip. The conversion chip is integrated in the second integrated circuit 1102.

The second communication module 1101 may be configured to obtain a data packet from a transmitting device, or obtain a data packet from a switch;
the second integrated circuit 1102 is specifically configured to:
decapsulate a UDP data packet into high-definition video data based on a UDP and output the high-definition video data to an output interface 203 via a third communication temporal interface of the conversion chip. The third communication temporal interface includes a HDMI, a Type-C interface, a DVI, a DP interface, a USB interface, a VGA interface or a MIPI; or,
decapsulate a TCP data packet into high-definition video data based on a TCP and output the high-definition video data to an output interface 203 via a third communication temporal interface of the conversion chip; or,
decapsulate a custom data packet into high-definition video data based on a custom communication protocol and output the high-definition video data to an output interface 203 via a third communication temporal interface of the conversion chip.

The output interface 1103 may be configured to output the high-definition video data to a display device (such as a display).

It should be understood that the receiving device 110 is only one example according to the embodiments of the disclosure. The receiving device 100 may have more or fewer parts than indicated, may combine two or more parts, or may have different configuration implementations of parts.

It can be understood that embodiments and undefined definitions or illustrations for functional parts included in the receiving device 110 of FIG. 11 may refer to the embodiment of FIG. 5, and descriptions thereof are omitted here.

Figure 12:
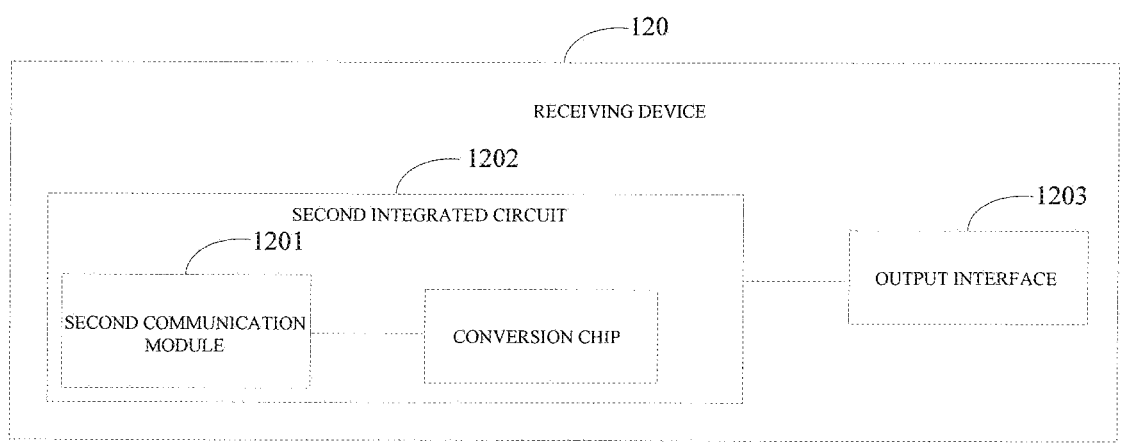

The present application provides another receiving device, as shown in FIG. 12, which can be configured to realize the receiving method for high-definition video data of the embodiment of FIG. 5.

The receiving device 120 may include, but not limited to, a second communication module 1201, a second integrated circuit 1202 and an output interface 1203, and may further include a conversion chip. The second communication module 1201 and the conversion chip are independently integrated in the second integrated circuit 1202.

The second communication module 1201 may be configured to obtain a data packet from the transmitting device, or obtain a data packet from the switch;
the second integrated circuit 1202 may be configured to process, via a fourth communication temporal interface of a MAC unit in the second integrated circuit 1202, the data packet input into the second integrated circuit 1202 to obtain high-definition video data and output the high-definition video data to the output interface 1203 via a third communication temporal interface of the conversion chip.

It should be noted that the second integrated circuit 1202 may include, but not limited to, a FPGA chip or an ASIC chip.

It should be noted that the second communication module 1201 may include, but not limited to, an electrical module or an optical module. The transmission rate of the optical module is not less than the second threshold, and the transmission rate of the electrical module is not less than the second threshold. The second threshold may include, but not limited to, 1 Gbps, 2.5 Gbps, 5 Gbps, 10 Gbps or 25 Gbps.

Figure 13:
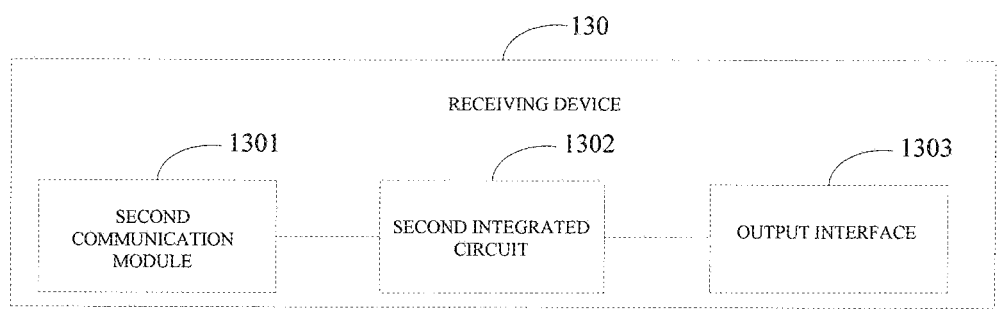

The disclosure provides another receiving device, as shown in FIG. 13, which can be configured to realize the receiving method for high-definition video data of the embodiment of FIG. 5.

The receiving device 130 may include, but not limited to, a second communication module 1301, a second integrated circuit 1302 and an output interface 1303. The second communication module 1301, the second integrated circuit 1302 and the output interface 1303 are sequentially connected.

The second communication module 1301 may be configured to obtain a data packet from a transmitting device, or obtain a data packet from a switchboard;
The second integrated circuit 1302 may be configured to process the data packet based on a communication protocol to obtain the high-definition video data.

The output interface 1303 may be configured to output the high-definition video data to an output device (such as a display device).

The second integrated circuit 1302 is specifically configured to:
when the data packet is a UDP data packet, decapsulate the UDP data packet based on the UDP to obtain high-definition video data; or,
when the data packet is a TCP data packet, decapsulate the TCP data packet based on the TCP to obtain high-definition video data; or,
when the data packet is a custom data packet, decapsulate the custom data packet based on a custom communication protocol to obtain high-definition video data.

The second integrated circuit 1302 is also specifically configured to:
when the data packet is a UDP data packet, decapsulate the UDP data packet based on the UDP to obtain first data and decompress the first data based on a distortionless decoding algorithm to obtain high-definition video data;
or,
when the data packet is a TCP data packet, decapsulate the TCP data packet based on the TCP to obtain first data and decompress the first data based on a distortionless decoding algorithm to obtain high-definition video data;
or,
when the data packet is a custom data packet, decapsulate the custom data packet based on the custom communication protocol to obtain first data and decompress the first data based on a distortionless decoding algorithm to obtain high-definition video data.

The distortionless decoding algorithm includes:
a run-length decoding algorithm, a Huffman decoding algorithm, a constant block decoding algorithm for binary images, a quadtree decoding algorithm, or a wavelet transform decoding algorithm.

The communication protocol includes a UDP, a TCP, or a custom communication protocol.

It should be noted that the output interface 1303 may include, but not limited to:
a HDMI, a DVI, a Type-C interface, a DP interface, a USB interface, a VGA interface, or a MIPI.

It should be noted that the second integrated circuit 1302 may include, but not limited to a FPGA chip or an ASIC chip.

It should be noted that the transmission rate of the second communication module 1301 is not less than a second threshold.

The second communication module 1301 may include, but not limited to, an electrical module or an optical module. The transmission rate of the optical module is not less than the second threshold, and the transmission rate of the electrical module is not less than the second threshold. The second threshold may include, but not limited to, 1 Gbps, 2.5 Gbps, 5 Gbps, 10 Gbps or 25 Gbps.

It should be understood that the receiving device 110 is only one example according to the embodiments of the disclosure. The receiving device 110 may have more or fewer parts than indicated, may combine two or more parts, or may have different configuration implementations of parts.

It can be understood that embodiments and undefined definitions or illustrations for functional parts included in the receiving device 130 of FIG. 13 may refer to the embodiment of FIG. 5, and descriptions thereof are omitted here.

Those ordinary skilled in the art may realize that the modules and algorithm steps of each example described in combination with the implementations of the disclosure can be performed by electronic hardware, computer software, or a combination thereof. In order to clearly explain the interchangeability of hardware and software, the composition and steps of each example have been described generally in terms of functions in the above description. Whether these functions are performed in hardware or software depends on the specific application and design constraints of the technical solution. Professional technicians can use different methods to implement the described functions for each specific application, but such implementation should not be considered to be beyond the scope of the disclosure.

Those skilled in the art can clearly understand that, for the convenience and brevity of the description, the specific working processes of the devices and modules described above can refer to the corresponding processes in the foregoing implementations of method, and are not repeated here.

In the several implementations provided in the disclosure, it should be understood that the disclosed equipment, device, and method may be implemented in other ways. For example, to describe the composition and steps of each example. Whether these functions are executed in hardware or software depends on the specific application of the technical solution and design constraints. Professional technicians can use different methods to implement the described functions for each specific application, but such implementation should not be considered beyond the scope of this disclosure.

The implementations of device and equipment described above are only schematic. For example, the division of the modules is only a logical function division. In actual implementation, there may be another division manner. For example, multiple modules or components may be combined or integrated into another device, or some features can be ignored or not be implemented. In addition, the displayed or discussed mutual coupling or direct coupling or communication connection may be indirect coupling or communication connection through some interfaces, equipment, devices or modules, and may also be electrical, mechanical or other forms of connection.

The modules described as separate components may or may not be physically separated, and the components displayed as modules may or may not be physical modules, may be located in one place, or may be distributed on multiple network modules. Some or all of the modules may be selected according to actual needs to achieve the objects of the solutions in the implementations of the disclosure.

In addition, each functional module in each implementation of the disclosure may be integrated into one processing module, or each module may exist separately physically, or two or more modules may be integrated into one module. The above integrated modules may be implemented in the form of hardware or software functional modules.

When the integrated module is implemented in the form of a software functional module and sold or used as an independent product, it can be stored in a computer-readable storage medium. Based on this understanding, the technical solution of the disclosure essentially or a part that contributes to the existing technology, or all or part of the technical solution may be embodied in the form of a software product. The computer software product is stored in a storage medium which includes instructions to enable a computer device (which may be a personal computer, a server, or a network device, etc.) to perform all or part of the steps of the method described in the implementations of the disclosure. The foregoing storage media include: U-disks, mobile hard disks, read-only memory (ROM), random access memory (RAM), magnetic disks, or optical disks and other media that can store program codes.

The above is only a specific implementation of the disclosure, but the scope of protection of the disclosure is not limited to this. Any person skilled in the art can easily think of various equivalent modifications or replacements within the technical scope disclosed in the disclosure which should be covered by the protection scope of the disclosure. Therefore, the protection scope of the disclosure shall be subject to the protection scope of the claims.

What is claimed is:

1. A transmitting method for high-definition video data, comprising:
obtaining, by a transmitting device, high-definition video data with different color space formats;
processing, by the transmitting device, the high-definition video data into a data packet; and
transmitting, by the transmitting device, the data packet to a first communication module; wherein the transmission rate of the first communication module is not less than a first threshold, and the first communication module is configured to transmit the data packet;
wherein the transmitting device comprises a conversion chip and a first integrated circuit; the conversion chip and the first integrated circuit are independently integrated in the transmitting device respectively;
when the first integrated circuit is a field programmable gate array (FPGA) chip,
processing, by the transmitting device, the high-definition video data into the data packet comprises:

transmitting, by the transmitting device, the high-definition video data to the conversion chip based on the first interface protocol, transmitting, based on a second interface protocol, the high-definition video data obtained by the conversion chip to the FPGA chip, and encapsulating the high-definition video data based on a communication protocol by the FPGA chip to obtain the data packet; and when the first integrated circuit is an application specific integrated circuit (ASIC) chip, processing, by the transmitting device, the high-definition video data into the data packet comprises:

transmitting, by the transmitting device, the high-definition video data to the conversion chip based on the first interface protocol, transmitting, based on the second interface protocol, the high-definition video data obtained by the conversion chip to the ASIC chip, and encapsulating the high-definition video data based on the communication protocol by the ASIC chip to obtain the data packet; wherein the first interface protocol comprises a HDMI protocol, a Type-C protocol, a DP protocol, a USB protocol, a MIPI protocol, a DVI protocol, or a VGA protocol; the second interface protocol comprises a transistor transistor logic (TTL) protocol, a low-voltage differential signaling (LVDS) protocol, the MIPI protocol, or a custom interface protocol; and the communication protocol comprises a user datagram protocol (UDP), a transmission control protocol (TCP), or a custom communication protocol.

2. The transmitting method for high-definition video data according to claim 1, wherein obtaining, by the transmitting device, high-definition video data with different color space formats comprises:

receiving, by the transmitting device, high-definition video data with different color space formats based on a first interface protocol; wherein the first interface protocol comprises a high definition multimedia interface (HDMI) protocol, a Type-C protocol, a display port (DP) protocol, a universal serial bus (USB) protocol, a mobile industry processor interface (MIPsi) protocol, a digital visual interface (DVI) protocol, or a video graphics array (VGA).

3. The transmitting method for high-definition video data according to claim 1, wherein the transmitting device comprises the conversion chip and the first integrated circuit; the conversion chip is integrated in the first integrated circuit;

when the first integrated circuit is a FPGA chip, processing, by the transmitting device, the high-definition video data into the data packet comprises:

transmitting, by the transmitting device, the high-definition video data to the conversion chip in the FPGA chip based on the first interface protocol, and encapsulating, by the FPGA chip, the high-definition video data transmitted by the conversion chip based on the second interface protocol to obtain the data packet; and when the first integrated circuit is an ASIC chip, processing, by the transmitting device, the high-definition video data into the data packet comprises:

transmitting, by the transmitting device, the high-definition video data to the conversion chip in the ASIC chip based on the first interface protocol, and encapsulating, by the ASIC chip, the high-definition video data transmitted by the conversion chip based on the second interface protocol to obtain the data packet; wherein the first interface protocol comprises al HDMI protocol, a Type-C protocol, a DP protocol, a USB protocol, a MIPI protocol, a DVI protocol, or a VGA protocol; the second interface protocol comprises a TTL protocol, a LVDS protocol, the MIPI protocol, or a custom interface protocol; and the data packet comprises a UDP data packet, a TCP data packet or a custom data packet.

4. The transmitting method for high-definition video data according to claim 3, wherein the first communication module is integrated in the first integrated circuit;

when the first integrated circuit is a FPGA chip, transmitting, by the transmitting device, the data packet to the first communication module comprises:

transmitting, by the transmitting device via a media access control (MAC) unit based on a third interface protocol, the data packet obtained by the FPGA chip to the first communication module; or, when the first integrated circuit is an ASIC chip, the transmitting, by the transmitting device, the data packet to the first communication module comprises:

transmitting, by the transmitting device via a MAC unit based on the third interface protocol, the data packet obtained by the ASIC chip to the first communication module, wherein the third interface protocol comprises a XFI protocol, a media independent interface (MII) protocol, a gigabit media independent interface (GMII) protocol, a reduced gigabit media independent interface (RGMII) protocol, a serial gigabit media independent interface (SGMII) protocol, a Serdes protocol, a XAUI protocol, or a RXAUI protocol.

5. The transmitting method for high-definition video data according to claim 1, wherein the transmitting device comprises the first integrated circuit;

when the first integrated circuit is a FPGA chip, processing, by the transmitting device, the high-definition video data into the data packet comprises:

encapsulating, by the transmitting device, the high-definition video data into a UDP data packet by a FPGA chip based on a UDP; or, encapsulating, by the transmitting device, the high-definition video data into a TCP data packet via the FPGA chip based on a TCP; or, encapsulating, by the transmitting device, the high-definition video data into a custom data packet via the FPGA chip based on a custom communication protocol; or, when the first integrated circuit is an ASIC chip, processing, by the transmitting device, the high-definition video data into the data packet comprises:

encapsulating, by the transmitting device, the high-definition video data into the UDP data packet by the ASIC chip based on the UDP;

encapsulating, by the transmitting device, the high-definition video data into the TCP data packet by the ASIC chip based on the TCP; or, encapsulating, by the transmitting device, the high-definition video data into the custom data packet by the ASIC chip based on the custom communication protocol.

6. The transmitting method for high-definition video data according to claim 1, wherein the transmitting device comprises the first integrated circuit;

when the first integrated circuit is a FPGA chip,
processing, by the transmitting device, the high-definition video data into the data packet comprises:
compressing, by the transmitting device, the high-definition video data by the FPGA chip based on a distortionless coding algorithm to obtain first data, and encapsulating the first data through the communication protocol to obtain the data packet; and
when the first integrated circuit is an ASIC chip,
processing, by the transmitting device, the high-definition video data into the data packet comprises:
compressing, by the transmitting device, the high-definition video data by the ASIC chip based on the distortionless coding algorithm to obtain first data, and encapsulating the first data through the communication protocol to obtain the data packet; wherein
the communication protocol comprises the UDP, the TCP, or the second custom communication protocol; and
the distortionless coding algorithm comprises:
a run-length coding algorithm, a Huffman coding algorithm, a constant block coding algorithm for binary images, a quadtree coding algorithm, a wavelet transform coding algorithm, or a custom arithmetic coding algorithm.

7. The transmitting method for high-definition video data according to claim 1, wherein
the first communication module comprises an electrical module; the electrical module comprises a physical layer (PHY) chip and a RJ-45 interface;
transmitting, by the transmitting device, the data packet to the first communication module comprises:
transmitting, by the transmitting device, the data packet to the PHY chip via a MAC unit based on the third interface protocol; wherein the PHY chip is configured to output the data packet to the RJ-45 interface, the RJ-45 interface is configured to transmit the data packet; and the third interface protocol comprises a XFI protocol, a MII protocol, a GMII protocol, a RGMII protocol, a SGMII protocol, a Serdes protocol, a XAUI protocol, or a RXAUI protocol; or,
the first communication module comprises an optical module;
transmitting, by the transmitting device, the data packet to the first communication module comprises:
transmitting, by the transmitting device, the data packet to the optical module via a MAC unit based on the third interface protocol;
convert, by the optical module, the data packet into an optical signal; and
transmit, by the optical module, the optical signal; wherein the third interface protocol comprises a XFI protocol, a MII protocol, a GMII protocol, a RGMII protocol, a SGMII protocol, a Serdes protocol, a XAUI protocol or a RXAUI protocol; and the transmission rate of the optical module is not less than the first threshold.

8. The transmitting method for high-definition video data according to claim 7, wherein
when the first communication module comprises the electrical module, and the electrical module comprises the PHY chip and the RJ-45 interface,
after transmitting, by the transmitting device, the data packet to the first communication module, the transmitting method further comprises:
outputting, by the transmitting device, the data packet to the RJ-45 interface by the PHY chip, and transmitting the data packet to a receiving device via the RJ-45 interface; or,
outputting, by the transmitting device, the data packet to the RJ-45 interface by the PHY chip, transmitting the data packet to a switch via the RJ-45 interface, and forwarding, via the switch, the data packet to the receiving device; wherein
the data packet comprises the UDP data packet, the TCP data packet or the custom data packet;
or,
when the first communication module comprises the optical module,
after transmitting, by the transmitting device, the data packet to the first communication module, the transmitting method further comprises:
converting, by the transmitting device, the data packet into the optical signal by the optical module and transmitting the optical signal to the receiving device; or,
converting, by the transmitting device, the data packet into the optical signal by the optical module, transmitting the optical signal to the switch, and forwarding, by the switch, the optical signal to the receiving device.

9. The transmitting method for high-definition video data according to claim 8, wherein
the receiving device comprises a first receiving device and a second receiving device;
the data packet comprises the UDP data packet or the TCP data packet;
after transmitting, by the transmitting device, the data packet to the first communication module, the transmitting method further comprises:
outputting, by the transmitting device, the UDP data packet or the TCP data packet to the RJ-45 interface by the PHY chip and transmitting the data packet to the switch via the RJ-45 interface, and forwarding, via the switch, the UDP data packet or the TCP data packet to the first receiving device and the second receiving device respectively.

10. The transmitting method for high-definition video data according to claim 9, wherein
the receiving device comprises the first receiving device and the second receiving device;
the data packet comprises the UDP data packet or the TCP data packet;
after transmitting, by the transmitting device, the data packet to the first communication module, the transmitting method further comprises:
converting, by the transmitting device, the UDP data packet or the TCP data packet into the optical signal through the optical module, transmitting the optical signal to the switch, and forwarding, via the switch, the optical signal to the first receiving device and the second receiving device.

* * * * *